United States Patent Office 3,445,482
Patented May 20, 1969

3,445,482
BIS(POLYHALOCYCLOALKENE)DICARBOXYLIC
ACIDS AND DERIVATIVES THEREOF
Louis Schmerling, Riverside, Ill., assignor to Universal
Oil Products Company, Des Plaines, Ill., a corporation
of Delaware
No Drawing. Filed Aug. 12, 1965, Ser. No. 479,296
Int. Cl. C07c 55/02, 69/34; C07d 5/00
U.S. Cl. 260—347.8      14 Claims

ABSTRACT OF THE DISCLOSURE

Bis(polyhalocycloalkene) dicarboxylic acids and derivatives thereof exemplified by diethyl bis(1,4,5,6,7,7-hexachloro-5-norbornen-2-ylmethyl) malonate, 2,3-bis(1,4,5,6,7,7 - hexachloro-5-norbornen-2-ylmethyl) succinic acid, and bis(1,4,5,6,7,7 - hexachloro-5-norbornen-2-yl)-3,3'-dicarboxylic acid. The compounds are useful as flame retardant additives for plastics, resins and textiles.

---

This invention relats to novel compositions of matter comprising bis(polyhalocycloalkene)dicarboxylic acids and derivatives thereof. More specifically, the invention is directed to these novel compositions of matter and a method for the preparation thereof.

The increased use of certain polymeric compositions of matter, either naturally occurring or synthetic in origin such as resins, plastics, textiles including rayon, nylon, Dacron, etc., wool, leather, cotton, etc., or other cellulose products such as paper in situations where the finished article is normally subject to excessive heat or the possibility of contact with an open flame necessitates the advisability of having these articles possess the capabilities of being able to withstand the aforementioned effects of heat and/or flame. For example, in recent years, plastics or resins when molded or formed, may be used as receptacles for electrical contacts, electrical appliances and equipment, for architectural paneling and bodies for airplanes, cars, boats, etc., as insulation, etc., and in other places where the possibility of contact with an open flame is present. It is therefore desirable that the finished products, either resins, plastics, etc., should possess the desirable physical characteristics of being resistant to flame and retardant to the action of the flame thereon. In order to render the article of commerce resistant or retardant to flame, the article should contain, either as an element thereof or by impregnation therewith, some compound which will impart the aforesaid property of flame retardancy or flame resistance to the specific article. In this respect, it has been found that certain novel compositions of matter comprising the present invention will, when added to certain polymeric substances, impart the desirable property of flame resistance or flame retardance to the aforemntioned substances.

In view of this, it is therefore an object of this invention to prepare novel compositions of matter which will impart desirable characteristic to plastics, resins, or other polymeric substances.

A further object of this invention is to provide novel compositions of matter which, when utilized as a monomer in the preparation of cetrain polymeric compounds including plastics, resins, etc., will impart flame retardancy to the finished product.

One embodiment of this invention resides in a composition of matter selected from the group consisting of bis(polyhalocycloalkene)dicarboxylic acids and anhydrides and esters thereof.

A further embodiment of this invention is found in a process for the preparation of a compound selected from the group consisting of bis(polyhalocycloalkene)dicarboxylic acids and anhydrides and esters thereof which comprises condensing a polyhalo substituted alkadiene with a compound selected from the group consisting of alkadienedicarboxylic acids and anhydrides and esters thereof at condensation conditions, and recovering the resultant compound.

Yet another embodiment of this invention is found in a composition of matter comprising the reaction product of a polymer containing at least one reactive functional group and a compound selected from the group consisting of bis(polyhalocycloalkene)dicarboxylic acids and anhydrides and esters thereof.

A specific embodiment of this invention is found in diethyl bis(1,4,5,6,7,7 - hexachloro-5-norbornen-2-ylmethyl) malonate.

Another specific embodiment of this invention resides in a process which comprises condensing hexabromocyclopentadiene with diethyl 2,3-divinylsuccinate at a temperature in the range of from about 50° to about 250° C., and recovering the resultant diethyl 2,3-bis(1,4,5,6,7,7-hexabromo-5-norbornen-2-yl)succinate.

Yet another specific embodiment of this invention is found in a composition of matter comprising the reaction product of a polymer containing at least one functional group and 2,3 - bis(1,4,5,6,7,7-hexachloro-5-norbornen-2-ylmethyl)succinic anhydride.

Other objects and embodiments will be found in the following further detailed description of this invention.

As hereinbefore set forth, the present invention is concerned with novel compositions of matter and to a process for the preparation thereof. These novel compositions of matter which comprise bis(polyhalocycloalkene)dicarboxylic acids, anhydrides, or esters thereof may be prepared by condensing a polyhalo substituted alkadiene with an alkadiene-dicarboxylic acid, anhydride or ester thereof, in a Diels-Alder type reaction. For purposes of this invention, the term "polyhalo substituted alkadiene" as used in the present specification and appended claims will refer to both alkadienic and cycloalkadienic compounds which contain at least two halogen substituents. Likewise, the term "cycloalkene" as used in the present specification and appended claims will refer to both mono- and polycyclic alkenes.

Cycloalkadienic compounds which may be used and which contain halogen substituents, said compounds containing only carbon, hydrogen and halogen atoms, possess the generic formula:

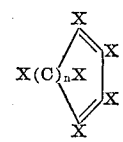

in which the X's are independently selected from the group consisting of hydrogen or halogen radicals having an atomic weight of from 35 to 80 (i.e., chlorine or bromine), at least two of the X's being halogen, and $n$ is an integer of from 1 to 2. Representative compounds include 1,2 - dichlorocyclopentadiene, 1,2,3-trichlorocyclopentadiene, 1,2,3,4-tetrachlorocyclopentadiene, 1,2,3,4,5-pentachlorocyclopentadiene, hexachlorocyclopentadine, 1,2,3,4 - tetrabromocyclopentadiene, 1,2,3,4,5-pentabromocyclopentadiene, hexabromocyclopentadien, etc. It is also contemplated that polyhalo substituted conjugated cyclohexadienes such as 1,2-dichloro-1,3-cyclohexadiene, 1,2,3-trichloro-1,3-cyclohexadiene, octachloro-1,3-cyclohexadiene, etc., 1,2-dibromo-1,3-cyclohexadiene, 1,2,3-tribromo- 1,3 - cyclohexadiene, octabromo-1,3-cyclohexadiene, etc., may also be used. In addition, it is also contemplated that the polyhalocycloalkadienes which may be used in preparing the treating agent of this process may contain more than one species of halo substituents such as, for example, 1 - chloro-2-bromocyclopentadiene, 1,2-dichloro-3-bromocyclopentadiene, 1,2-dichloro-5,5-dibromocyclopentadiene, etc., although not necessarily with equivalent results.

Halogenated conjugated open-chain alkadienes containing only carbon, hydrogen and halogen atoms such as 1,3 - dichloro-1,3-butadiene, 1-bromo-4-chloro-1,3-butadiene, 1,3 - dibromo-1,3-butadiene, 1,1,3-trichloro-1,3-butadiene, 1,1,2 - trichloro-1,3-butadiene, 1,1,4-tribromo-1,3-butadiene, 1,1,4,4 - tetrachloro-1,3-butadiene, 1,1,4,4-tetrabromo - 1,3 - butadiene, 1,3-dichloro-2-methyl-1,3-butadiene, 1,4 - dichloro-2-methyl-1,3-butadiene, 1,1,4,4-tetrachloro - 2 - methyl-1,3-butadiene, 1,1,4,4-tetrabromo-2 - methyl - 1,3-butadiene, 1,1-dichloro-3-bromo-1,3-butadiene, 1-chloro-3-bromo-1,3-butadiene, 2-bromo-3-chloro-1,3 - butadiene, 1,4 - dichloro-2-bromomethyl-1,3-butadiene, etc. may also be used.

Suitable alkadienedicarboxylic acids which possess two double bonds and which are characterized by the presence of at least one hydrogen atom on each of the doubly-bonded carbon atoms which may be condensd with the aforementioned polyhaloalkadienes include muconic acid divinylmalonic acid, diallylmalonic acid, 2,3-divinylsuccinic acid, 2,3-diallylsuccinic acid, etc., 2,2-divinylsuccinic anhydride, 2,2-diallylsuccinic anhydride, 2,3-divinylsuccinic anhydride, 2,3-diallylsuccinic anhydride, etc., and esters of the aforementioned acids such as dimethyl muconate, diethyl muconate, dipropyl muconate, dibutyl muconate, dimethyl divinylmalonate, diethyl divinylmalonate, dipropyl divinylmalonate, dimethyl diallylmalonate, diethyl diallylmalonate, dipropyl diallylmalonate, dimethyl 2,2-divinylsuccinate, diethyl 2,3-divinylsuccinate, dipropyl 2,3-divinylsuccinate, dimethyl 2,3-diallylsuccinate, diethyl 2,3-diallylsuccinate, dipropyl 2,3-diallylsuccinate, etc. In the preferred embodiment of the invention, the alkadienedicarboxylic acids, anhydrides and esters thereof which are used comprise those in which the acid or ester moieties are separated by at least two carbon atoms. It is to be understood that the aforementioned polyhalo substituted alkadienes and alkadienedicarboxylic acids, anhydrides and esters thereof are only representative of the class of compounds which may be used and that the present invention is not necessarily limited thereto.

The novel compositions of matter may be prepared in any suitable manner by either a batch or continuous type operation. For example, when a batch type operation is used, a quantity of the alkadienedicarboxylic acid, anhydride or ester thereof and the polyhalo substituted alkadiene is placed in an appropriate apparatus preferably a condensation vessel, which is maintained at the proper operating conditions of temperature and allowed to condense. If so desired, the condensation may be effected in the presence of a substantially inert organic solvent, said solvents including aromatic hydrocarbons such as benzene, toluene, the xylenes, ethylbenzene, etc.; paraffinic and cycloparaffinic hydrocarbons such as n-hexane, n-heptane, n-decane, cyclopentane, cyclohexane, methylcyclopentane, etc. Generally speaking, the condensation is effected at a temperature ranging from about 50° to 200° C. If so desired, the condensation which is also usually effected at atmospheric pressure may be effected at elevated pressures ranging from 2 to about 50 atmospheres or more, the amount of pressure being that which is necessary to maintain a major portion of the reactants in the liquid phase.

It is also contemplated within the scope of this invention that the process may be effected in a continuous type of manner. When such a type of operation is used, the starting materials comprising the halo substituted alkadiene and the alkadienedicarboxylic acid, anhydride or ester thereof are continuously charged to the reaction vessel which is maintained at the proper operating conditions of temperature and pressure. In the event that the condensation is effected in the presence of an inert organic solvent, the solvent is also continuously charged thereto through a separate line or, if so desired, may be admixed with the starting materials and charged thereto in a single stream. At the end of the residence time, the reactor effluent is continually withdrawn and subjected to a separation step wherein the solvent and/or any unreacted starting materials are separated from the desired product, the solvent and unreacted starting materials being recycled to form a portion of the feed stock while the desired reaction product is recovered.

It is also contemplated within the scope of this invention that the alkadienedicarboxylic acid, anhydride or ester thereof may be condensed with a conjugated alkadiene such as 1,3-butadiene and the resultant adduct thereafter condensed with the polyhalo substituted cycloalkadiene to form bis(polyhalotricycloalkene)dicarboxylic acids, anhydrides or esters thereof.

Examples of novel compositions of matter which may be prepared according to the process of this invention include 2,2-bis(1,4,5,6,7,7-hexachloro-5-norbornen-2-yl)-succinic acid, 2,2-bis(1,4,5,6,7,7-hexachloro-5-norbornen-2-yl)succinic anhydride, 2,2-bis(1,4,5,6,7,7-hexachloro-5-norbornen-2-ylmethyl)succinic acid, 2,2-bis(1,4,5,6,7,7-hexachloro-5-norbornen-2-ylmethyl)succinic anhydride, 2,3-bis(1,4,5,6,7,7-hexachloro - 5 - norbornen-2-yl)succinic acid, 2,3-bis(1,4,5,6,7,7-hexachloro-5-norbornen-2-ylmethyl)succinic acid, 2,3-bis(1,4,5,6,7,7-hexachloro-5-norbornen-2-yl)succinic anhydride, 2,3-bis(1,4,5,6,7,7-hexachloro-5-norbornen-2-ylmethyl)succinic anhydride, 2,2-bis(1,4,5,6,7,7-hexabromo - 5 norbornen-2-yl)succinic acid, 2,2-bis(1,4,5,6,7,7-hexabromo-5-norbornen-2-yl)succinic anhydride 2,2-bis(1,4,5,6,7,7-hexabromo-5-norbornen-2-ylmethyl)succinic acid 2,2-bis(1,4,5,6,7,7-hexabromo-5-norbornen-2-ylmethyl)succinic anhydride, 2,3-bis(1,4,5,6,7,7-hexabromo - 5 - norbornen-2-yl)succinic acid, 2,3-bis(1,4,5,6,7,7-hexabromo-5-norbornen-2-ylmethyl)succinic acid, 2,3-bis(1,4,5,6,7,7-hexabromo-5-norbornen-2-yl)succinic anhydride, 2,3-bis(1,4,5,6,7,7-hexabromo-5-norbornen-2-ylmethyl)succinic anhydride, dimethyl bis(1,4,5,6,7,7-hexachloro - 5 - norbornen-2-yl) malonate, dimethyl 3,3-bis(1,4,5,6,7,7-hexachloro-5-norbornen - 2 - yl)-glutarate, diethyl bis(1,4,5,6,7,7-hexachloro-5-norbornen-2-yl)malonate, diethyl 3,3-bis(1,4,5,6,7,7-hexachloro-5-norbornen-2-yl)adipate, dipropyl 4,4-bis(1,4,5,6,7,7-hexachloro-5-norbornen-2-yl)pimelate, dipropyl 3,3-bis(1,4,5,6,7,7-hexachloro-5-norbornen-2-yl) glutarate, dimethyl 2,3-bis(1,4,5,6,7,7-hexachloro-5-norbornen-2-yl)succinate, diethyl 2,3-bis(1,4,5,6,7,7-hexachloro-5-norbornen-2-yl)succinate, dimethyl bis(1,4,5,6,7,7-hexachloro - 5 - norbornen - 2 - ylmethyl)malonate, dimethyl 3,3-bis(1,4,5,6,7,7-hexachloro-5-norbornen-2-ylmethyl)glutarate, diethyl bis(1,4,5,6,7,7-hexachloro-5-norbornen-2-ylmethyl)malonate, diethyl 4,4-bis(1,4,5,6,7,7-hexachloro-5-norbornen-2-ylmethyl)adipate, dipropyl bis(1,4,5,6,7,7-hexachloro - 5 - norbornen-2-ylmethyl) malonate, dipropyl 4,4-bis(1,4,5,6,7,7-hexachloro-5-norbornen-2-ylmethyl)pimelate, dimethyl 2,3-bis(1,4,5,6,7,7-hexachloro-5-norbornen - 2 - ylmethyl)succinate, diethyl 2,3-bis(1,4,5,6,7,7 - hexachloro-5-norbornen-2-ylmethyl) succinate, bis(1,4,5,6,7,7 - hexachloro-5-norbornen-2-yl)-3,3'-dicarboxylic acid, etc. It is to be understood that the aforementioned compounds are only representative of the novel compositions of matter which may be prepared and that the present invention is not necessarily limited thereto.

As hereinbefore set forth, the aforementioned bis (polyhalocycloalkene)dicarboxylic acid, anhydride and esters thereof are reacted with certain polymeric compositions of matter containing at least one reactive functional group. An example of these polymeric products comprises epoxy resins which may be cured by the addition of the bis(polyhalocycloalkene)dicarboxylic acid, anhydride or ester thereof. The resins in an uncured state are thermoplastic and may range from low viscosity liquids to high melting point brittle solids. Examples of epoxy resins include the condensation product of epichlorohydrin and bis-phenol, epoxidized oils, olefins, etc. The aforementioned acid, anhydride or ester thereof will react with the epoxy resin by condensing with the reactive epoxy or oxirane group present in the molecule to form a cross-linked tri-dimensional structure. By utilizing the particular bis(polyhalocycloalkene)dicarboxylic acid, anhydride or ester thereof, the resultant product will be stable in regard to color, said stability being of particular advantage when utilizing the resins for certain specific purposes, such as floor surfacing, coatings, etc., as well as possessing flame retardancy.

Another polymeric product which may be reacted with the acid, anhydride or ester thereof of the type hereinbefore set forth comprises the polyurethanes prepared from prepolymers in which the reactive functional group is an isocyanate end group. The particular prepolymer to be treated with the acid, anhydride or ester will be prepared by reacting a polyester with an excess of an isocyanate such as tolylene diisocyanate, polymethylene polyphenyl isocyanate, p,p'-diphenylmethane diisocyanate, etc. The resulting prepolymer will be a linear low molecular weight product. The prepolymer is then cured by reaction with a bis(polyhalocycloalkene)dicarboxylic acid, anhydride or ester thereof to form the desired product. The curing of the prepolymer by the addition of the acid, anhydride or ester results in the cross-linking or chain extension of the polymer to give higher molecular weight compounds. These compounds may be prepared in foam form by incorporating a foaming agent such as water, alcohol, etc., during the curing step. This final product will then possess the desired physical properties of the type hereinbefore set forth, that is, a high stability as regards color changes due to deterioration. In addition to being used as a foam, the urethanes may be used as coatings said coatings having desirable characteristics as compared to other urethanes which have been prepared utilizing other chlorinated cyclic compounds, such characteristics including being fast drying, possessing a hard surface, a deep gloss, a high resistance to abrasion and weathering as well as an excellent resistance to fire. When utilizing these urethanes as coatings of this type, it is necessary in many instances that the coating also have a high resistance to changes in color especially when being exposed to climatic conditions of sun, heat, cold, etc. By utilizing a bis(polyhalocycloalkene)dicarboxylic acid, anhydride or ester thereof of the type set forth in the present invention, the coating will possess fire retardance as well as the necessary physical characteristics and retain the desired color for a longer period of time than will urethane coatings which do not contain this particular acid or anhydride but contain other chlorinated cyclic derivatives.

Yet another example of prepolymers containing an excess of at least one reactive functional group which may be reacted with the bis(polyhalocycloalkene)dicarboxylic acid, anhydride or ester thereof comprises polyamides. These polyamides may be prepared by condensing a polyamine with a dibasic acid. Examples of these polyamides would be the condensation of an amine containing more than two functional groups such as diethylenetriamine, dipropylenetriamine, etc., or with a molar excess of a diamine such as ethylenediamine, propylenediamine, etc., with a dibasic acid such as adipic acid, sebacic acid, etc., to form a prepolymer, said prepolymer containing a reactive functional amine group which may then be cross-linked with a bis(polyhalocycloalkene)dicarboxylic acid, anhydride or ester thereof. This cross-linking may be done at temperatures ranging from about 200° up to about 300° C. or more. The resulting cured or cross-linked polyamide may then be used for molding resins, films, coatings, insulation, etc., the finished product again exhibiting the desired physical properties of being flame resistant and also being resistant to color changes due to the stability of the bis(polyhalocycloalkene)dicarboxylic acid, anhydride or ester thereof which is utilized in the preparation as contrasted to other polyamine compounds which contain chlorinated cyclic derivatives.

Another prepolymer which may be cured or crosslinked by the use of the aforementioned acid or anhydride thereof are polyesters which have been formed by the reaction of a dibasic acid, unsaturated in nature, such as maleic acid with a molar excess of a glycol, or with a polyhydroxy compound which contains more than two —OH groups such as hexanetriol. The resulting polyester may then be cross-linked utilizing a bis(polyhalocycloalkene)dicarboxylic acid, anhydride or ester thereof to form the desired products. For example, polyester resins may be cross-linked with an acid, anhydride or ester of this type to form alkyds which will possess both flame-retardant and color stable properties. In addition to their use as coatings, the cross-linked polyesters may be used for molding and casting polymers which also possess the aforementioned desired physical characteristics.

The prepolymers of the type hereinbefore set forth which contain an excess of at least one reactive functional group, and the bis(polyhalocycloalkene)dicarboxylic acid, anhydride or ester thereof may be reacted in any manner known in the art, the reaction conditions such as temperature and pressure being dependent upon the particular compounds undergoing curing or cross-linking. Usually the curing or cross-linking of the prepolymer with the particular acid, anhydride or ester thereof will be effected at temperatures ranging from room temperature (about 25° C.) up to about 300° C. or more. In addition, the acid, anhydride or ester thereof will be present in the finished reaction product in various concentrations, ranging from about 5% to about 50% or more of the finished product, the particular concentration again being dependent upon the particular use to which the finished polymeric product will be put.

The following examples are given to illustrate the process of the present invention which, however, are not intended to limit the generally broad scope of the present invention in strict accordance therewith.

Example I

A mixture of 270 g. (1.0 mole) of hexachlorocyclopentadiene and 120 g. (0.5 mole) of diethyl diallylmalonate is dissolved in 100 cc. of xylene and the solution is placed in a condensation flask provided with heating and refluxing means. The solution is then heated under reflux for a period of about 6 hours at the end of which the flask and contents thereof are allowed to cool to room temperature. The solvent is flashed off and the reaction product is subjected to fractional crystallization. The desired product comprising diethyl bis(1,4,5,6,7,7-hexachloro-5-norbornen-2-ylmethyl)malonate is recovered.

Example II

In this example, a mixture of 270 g. (1.0 mole) of hexachlorocyclopentadiene and 99 g. (0.5 mole) of 2,3-diallylsuccinic acid is placed in a condensation apparatus along with 100 cc. of xylene. The reaction mixture is heated to reflux and maintained thereat for a period of about 8 hours. At the end of this time, the solvent is flashed off and the reaction mixture is permitted to cool and crystallize. The desired adduct comprising 2,3-bis (1,4,5,6,7,7 - hexachloro-5-norbornen-2-ylmethyl)succinic acid is separated and recovered by recrystallization.

Example III

In this experiment, a mixture of 270 g. (1.0 mole) of hexachlorocyclopentadiene and 89 g. (0.5 mole) of 2,3-diallylsuccinic anhydride is placed in a condensation apparatus along with 100 g. of xylene. The apparatus and contents thereof is heated under a reflux condenser and maintained at a temperature of about 150° C. for a period of about 8 hours. At the end of this time, the flask and contents thereof are allowed to cool to room temperature and the solvent is flashed off. The remaining portion of the reaction mixture is subjected to fractional crystallization and the desired condensation product comprising 2,3 - bis(1,4,5,6,7,7-hexachloro-5-norbornen-2-ylmethyl) succinic anhydride is recovered.

Example IV

In this example, 230 g. (0.5 mole) of hexabromocyclopentadiene and 56 g. (0.25) mole) of diethyl 2,3-divinylsuccinate are placed in a condensation apparatus along with 100 g. of benzene. The reaction mixture is heated to reflux and maintained thereat for a period of 8 hours. At the end of this time, the apparatus and contents thereof are allowed to cool to room temperature. The solvent is removed and the reaction mixture is subjected to fractional crystallization, the desired diethyl 2,3-bis(1,4,5,6,7,7-hexabromo-5-norbornen - 2 - yl)succinate being recovered.

Example V

A mixture of 270 g. (1.0 mole) of hexachlorocyclopentadiene and 71 g. (0.5 mole) of muconic acid along with 100 g. of toluene is placed in a condensation apparatus and heated to reflux. After a period of 8 hours the solvent is flashed off and the remaining reaction mixture is subjected to crystallization. The desired product comprising bis(1,4,5,6,7,7-hexachloro-5-norbornen-2-yl)- 3,3'-dicarboxylic acid is separated and recovered.

Example VI

A polyester resin is prepared by charging 99 g. (13 mole) of propylene glycol to a reaction vessel and heating said glycol to a temperature of 125° C. The adduct comprising 2,3 - bis(1,4,5,6,7,7-hexachloro-5-norbornen-2-ylmethyl)succinic anhydride which is prepared according to the process set forth in Example III above is gradually charged to the reaction vessel which is maintained at a temperature of about 110° C. Upon completion of the addition of the adduct, the flask and contents thereof are then heated to a temperature of about 160° C. and maintained thereat for a period of about 8 hours. Following this, 40 g. (0.45 mole) of maleic anhydride is added to the reaction vessel which is thereafter maintained at a temperature of about 165° C. for an additional period of 8 hours. At the end of this time, the resin which is formed is recovered by pouring the same onto an aluminum foil. The solid resin will be ignited with difficulty over a Bunsen burner and will be self-extinguishing as soon as it is removed from the flame.

Example VII

Other polymers such as alkyd resins may be prepared by admixing a compound such as 3,3-bis(1,4,5,6,7,7-hexachloro-5-norbornen-2-ylmethyl)glutaric acid with glycerol, a dibasic acid anhydride such as phthalic anhydride and a fatty acid such as linseed oil to form extended alkyd resins. These resins thus formed can be used as intermediates in varnishes and paints to impart finishes to objects which have a high gloss and which are water and alkali resistant. In addition, the finished product will also have excellent flame retardant properties.

Other plastics which may be prepared include polyurethane resins and foams in which a compound such as diethyl 2,3-bis(1,4,5,6,7,7-hexabromo-5-norbornen-2-yl)succinate is reacted with a polyol such as 1,2,6-hexanetriol. The resulting product is then admixed with toluene-2,4-diisocyanate to form a rigid white composition of matter which will be self-extinguishing when removed from direct contact with a flame.

I claim as my invention:

1. A compound selected from the group consisting of dicarboxylic acid, anhydride and lower alkyl esters thereof, said acid having the formula:

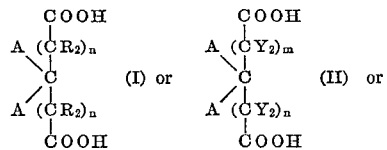

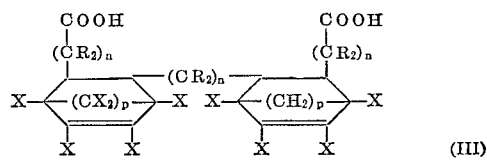

and A is

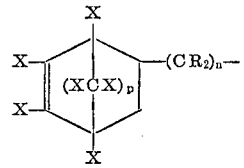

wherein X is chlorine, bromine or hydrogen, at least two X's of each ring being chlorine or bromine; R is hydrogen or lower alkyl; Y is hydrogen, lower alkyl or A, one and only one Y being A; $m$ is an integer of from 1 to 5; $n$ is independently an integer of from 0 to 5; and $p$ is 1 or 2.

2. A compound as defined in claim 1 futher characterized in that each X is chlorine.

3. A compound as defined in claim 1 further characterized in that each X is bromine.

4. Diethyl bis(1,4,5,6,7,7-hexachloro-5-norbornen-2-ylmethyl)malonate.

5. 2,3-bis(1,4,5,6,7,7-hexachloro-5-norbornen-2-ylmethyl)succinic anhydride.

6. 2,3-bis(1,4,5,6,7,7-hexachloro-5-norbornen-2-ylmethyl)succinic acid.

7. Diethyl 3,3-bis(1,4,5,6,7,7-hexabromo-5-norbornen-2-yl)glutarate.

8. Bis(1,4,5,6,7,7-hexachloro-5-norbornen-2-yl)-3,3'-dicarboxylic acid.

9. A process which comprises condensing two mole proportions of a polyhalo-substituted cycloalkadiene having the formula

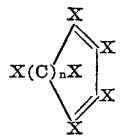

in which X is chlorine, bromine or hydrogen, at least two X's being chlorine or bromine, and $n$ is 1 or 2, at a temperature of from about 50° to about 200° C., with one mole proportion of an alkadienedicarboxylic acid containing up to about 10 carbon atoms and having at least one hydrogen atom on each of the doubly-bonded carbon atoms, or the anhydride or a lower alkyl ester of said acid.

10. A process which comprises condensing hexachlorocyclopentadiene with diethyl diallylmalonate at a temperature in the range of from about 50° to about 200° C., and recovering the resultant diethyl bis(1,4,5,6,7,7-hexachloro-5-norbornen-2-ylmethyl)malonate.

11. A process which comprises condensing hexachlorocyclopentadiene with 2,3-diallylsuccinic anhydride at a temperature in the range of from about 50° to about 200° C., and recovering the resultant 2,3-bis(1,4,5,6,7,7-hexachloro-5-norbornen-2-ylmethyl)succinic anhydride.

12. A process which comprises condensing hexachlorocyclopentadiene with 2,3-diallylsuccinic acid at a temperature in the range of from about 50° to about 200° C., and recovering the resultant 2,3 - bis(1,4,5,6,7,7 - hexachloro-5-norbornen-2-ylmethyl)succinic acid.

13. A process which comprises condensing hexabromocyclopentadiene with diethyl 2,3-divinylsuccinate at a temperature in the range of from about 50° to about 200° C., and recovering the resultant diethyl 2,3-bis(1,4,5,6,7,7-hexabromo-5-norbornen-2-yl)succinate.

14. A process which comprises condensing hexachlorocyclopentadiene with muconic acid at a temperature in the range of from about 50° to about 200° C., and recovering the resultant bis(1,4,5,6,7,7-hexachloro-5-norbornen-2-yl)-3,3'-dicarboxylic acid.

References Cited

UNITED STATES PATENTS 3,371,101   2/1968   Bloch _____ 260—346.6

ALEX MAZEL, *Primary Examiner.*

BERNARD I. DENTZ, *Assistant Examiner.*

U.S. Cl. X.R.

260—75, 78, 78.4, 468, 514; 252—8.1